US011958089B2

(12) United States Patent
Geng

(10) Patent No.: US 11,958,089 B2
(45) Date of Patent: Apr. 16, 2024

(54) METHOD AND APPARATUS FOR REMOVAL OF MICROSCOPIC CONTAMINANT PARTICULATES FROM SUPERCONDUCTING RADIO FREQUENCY CAVITIES AND CAVITY STRINGS

(71) Applicant: JEFFERSON SCIENCE ASSOCIATES, LLC, Newport News, VA (US)

(72) Inventor: Rongli Geng, Yorktown, VA (US)

(73) Assignee: JEFFERSON SCIENCE ASSOCIATES, LLC, Newport News, VA (US)

( * ) Notice: Subject to any disclaimer, the term of this patent is extended or adjusted under 35 U.S.C. 154(b) by 646 days.

(21) Appl. No.: 17/156,981

(22) Filed: Jan. 25, 2021

(65) Prior Publication Data

US 2021/0316340 A1 Oct. 14, 2021

Related U.S. Application Data

(60) Provisional application No. 62/989,627, filed on Mar. 14, 2020.

(51) Int. Cl.

| | |
|---|---|
| ***B08B 7/00*** | (2006.01) |
| ***B08B 3/02*** | (2006.01) |
| ***H05H 7/20*** | (2006.01) |

(52) U.S. Cl.

CPC .............. *B08B 7/0021* (2013.01); *B08B 3/02* (2013.01); *H05H 7/20* (2013.01); *Y10T 29/49014* (2015.01)

(58) Field of Classification Search

CPC ........... B08B 7/0021; B08B 3/02; B08B 5/02; B08B 9/00; B08B 9/0433; Y10T 29/49014

USPC ..................................... 29/599, 25.01, 592.1

See application file for complete search history.

(56) References Cited

U.S. PATENT DOCUMENTS 11,202,362 B1 * 12/2021 Rey .......................... H05H 7/20
11,464,102 B2 * 10/2022 Romanenko ........... G06N 10/00

* cited by examiner

*Primary Examiner* — Thiem D Phan

(57) ABSTRACT

A method and apparatus for removing microscopic contaminant particulates by high pressure liquid nitrogen jet cleaning from the inner surface of a superconducting radio frequency cavity or a string of multiple cavities and transporting the removed particulates out of the inner space enclosed by the cleaned surfaces. The cleaning method of the invention suppresses field emission, resulting in an increase of the usable accelerating gradient of the cavities and a reduction of the activated radioactivity in accelerator components around cavities.

20 Claims, 4 Drawing Sheets

METHOD AND APPARATUS FOR REMOVAL OF MICROSCOPIC CONTAMINANT PARTICULATES FROM SUPERCONDUCTING RADIO FREQUENCY CAVITIES AND CAVITY STRINGS

This application claims the priority of Provisional U.S. Patent Application Ser. No. 62/989,627 filed Mar. 14, 2020, the contents of which are incorporated herein by reference in their entirety.

The United States Government may have certain rights to this invention under Management and Operating Contract No. DE-AC05-06OR23177 from the Department of Energy.

FIELD OF THE INVENTION

The present invention relates to improving the operation of superconducting radio-frequency (SRF) cavities and more particularly to the removal of microscopic contaminant particles from SRF cavities and cavity strings.

BACKGROUND OF THE INVENTION

Proposed methods for cleaning of chamber components include simply immersing those components in liquid nitrogen; high pressure water rinsing (an ordinary technology commonly used vertically in production of nearly all superconducting radio frequency cavity cryomodules and occasionally used horizontally in re-cleaning of a contaminated cryomodule); CO2 snow cleaning (only in the research phase at DESY, a national lab in Germany, for cleaning superconducting radio frequency cavities, although no practical use has been demonstrated for SRF cavities); and helium processing and plasma cleaning (only useful for removal of frozen gases or thin layer of condensed hydrocarbon, incapable of particulate removal from the surface of a superconducting radio frequency cavity).

Although various cleaning methods have been proposed for final cleaning of cavity strings during production of new cryomodules and for in-situ cleaning of contaminated cryomodules after accelerator operation, they are limited in the size of particles that can be removed and typically require the disassembly and reassembly of the cryomodule, which is extremely time-consuming and expensive.

Accordingly, there is a need for a more effective method for the final cleaning of superconducting radio frequency (SRF) cavities and cavity strings during production of new cryomodules and for in-situ cleaning of contaminated cryomodules after accelerator operation. There is also a need for removal of a wider size range of contaminant particulates, down to a few nanometers, on the surface of SRF cavities, hence permitting a larger cavity acceleration gradient unlimited by field emission. The rapid recovery of contaminated cavities in an operational cryomodule, without requiring disassembly and reassembly of the cryomodule, would greatly reduce cost and down time. Reducing field emission of a superconducting radio frequency cavity over its life cycle improves the machine energy hence achieving better accelerator capability, improves the accelerator availability and thus better operation efficiency, and reduces activation of accelerator components hence emitting less radioactive burden to the environment.

Object of the Invention

It is therefore an object of the present invention to provide more effective method for the final cleaning of superconducting radio frequency (SRF) cavities and cavity strings during production of new cryomodules and for in-situ cleaning of contaminated cryomodules after accelerator operation.

A further object is to enable removal of a wider size range of contaminant particulates, down to a few nanometers, on the surface of SRF cavities, hence permitting a larger cavity acceleration gradient unlimited by field emission.

A further object is to enable a cleaning method for an operational cryomodule that allows rapid recovery of contaminated cavities without requiring disassembly and reassembly of the cryomodule, which would greatly reduce cost and down time. The cleaning process would reduce field emission of an SRF cavity over its life cycle and improve the machine energy thereby achieving better accelerator capability. It would also result in increased accelerator availability, better operation efficiency, and reduced activation of accelerator components hence emitting less radioactive burden to the environment.

These and other objects and advantages of the present invention will be understood by reading the following description along with reference to the drawings.

SUMMARY OF THE INVENTION

The invention is a method and apparatus for removing microscopic contaminant particulates by high pressure liquid nitrogen jet cleaning from the inner surface of a superconducting radio frequency cavity or a string of multiple cavities and transporting the removed particulates out of the inner space enclosed by the cleaned surfaces. The improved cleaning method of the invention suppresses field emission, resulting in an increase of the usable accelerating gradient of the cavities and a reduction of the activated radioactivity in accelerator components around cavities.

BRIEF DESCRIPTION OF THE SEVERAL VIEWS OF THE DRAWING(S)

Reference is made herein to the accompanying drawings, which are not necessarily drawn to scale, and wherein.

DETAILED DESCRIPTION

Figure 1:
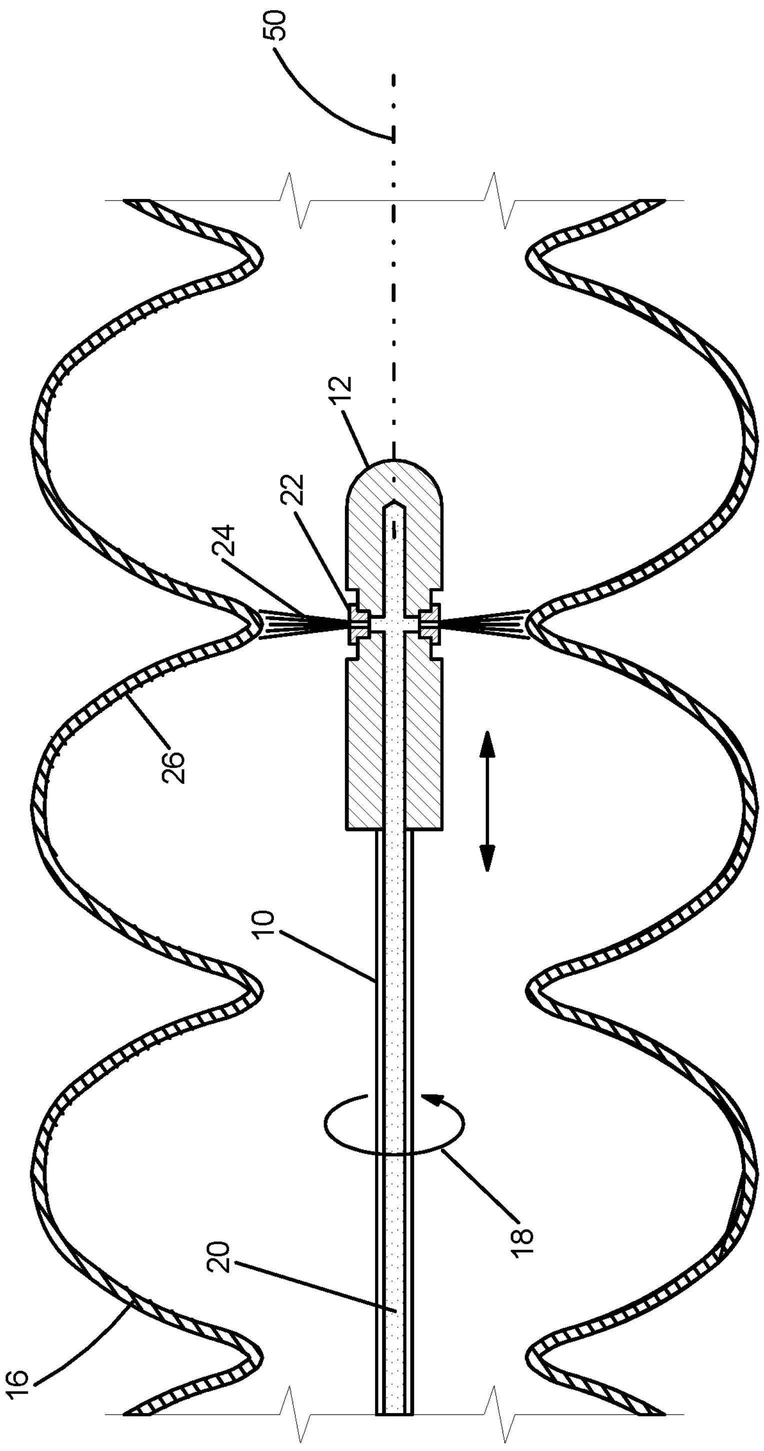
FIG. 1 is a sectional view of a SRF cavity depicting an apparatus for removing microscopic contaminant particles from an SRF cavity according to the current invention.

With reference to FIG. 1, a lance 10 carrying a cleaning head 12 at its end penetrates into the inner space of a superconducting radio frequency cavity 14 or a string 16 of multiple cavities. The orientation of the cavity or the cavity string is either vertical or horizontal depending on the application. The lance rotates 18 as it penetrates progressively over the length of the device under this cleaning treatment. Filtered high pressure, 500-6000 PSI, liquid nitrogen 20 is supplied to the lance 10 by an external cryogenic booster pump, which draws liquid nitrogen from an ordinary external liquid nitrogen storage tank (see FIG. 6). The high pressure liquid nitrogen 20 is transferred by the lance 10 to its cleaning head 12 and exits through a number of nozzles 22, producing high pressure liquid nitrogen jets 24.

Figure 2:
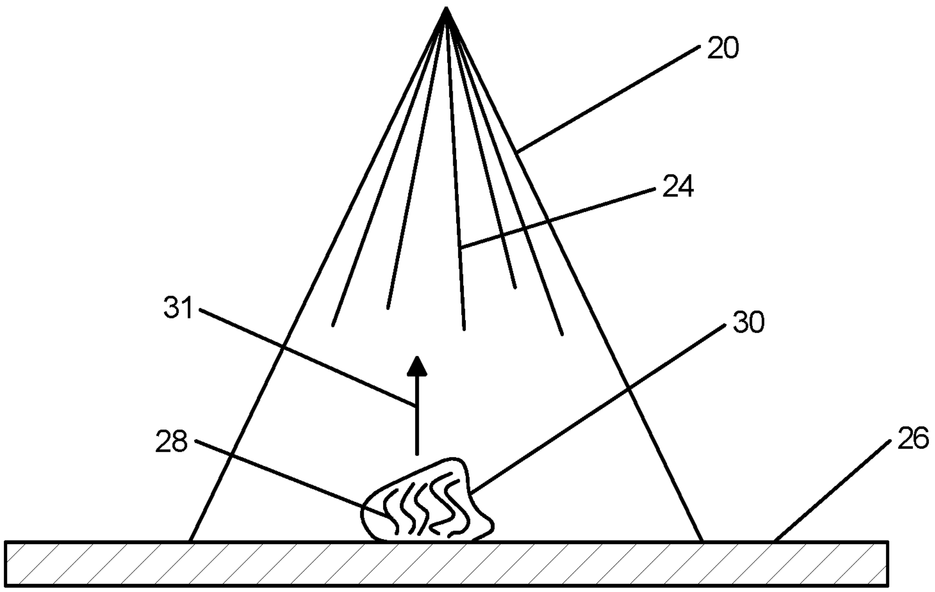
FIG. 2 is a conceptual diagram depicting a preferred embodiment of a contaminant removal method according to the invention.
Figure 3:
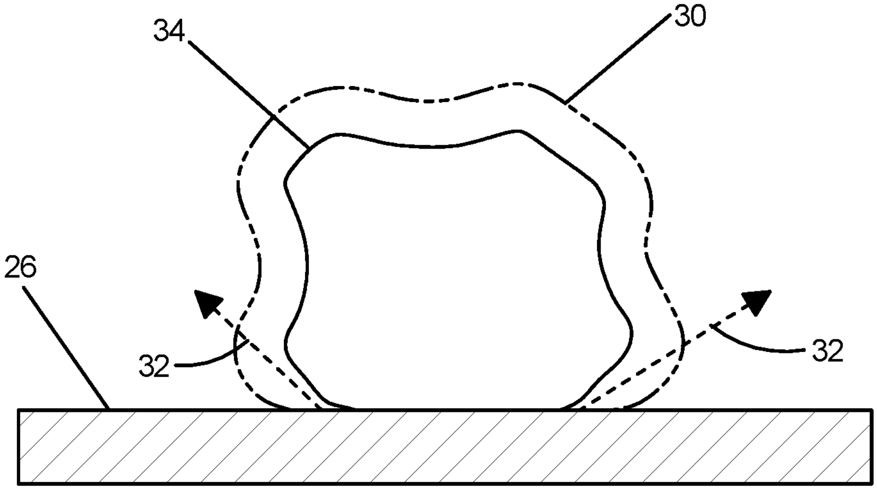
FIG. 3 depicts the breakage of the bond between the microscopic particles from the inner surface of the SRF cavity by cold shrinkage differential.

As shown in FIG. 2, the jets 24, when hitting the cavity wall inner surface 26, transfer energy via sound waves 28 to the cleaning location, hence dislodging microscopic particulates 30 initially adhered thereto in a dislodging direction 31 away from the cavity inner surface. In addition, as shown in FIG. 3, the unique effect of cold shrinkage differential between the particulate and the cavity wall generates a breaking force 32 and overcomes the bonding force across the interface between the particulate and the cavity inner surface 26. The microscopic particulate 30 is shrunk by the LN exposure from an initial condition to a smaller sized particulate 34.

Figure 4:
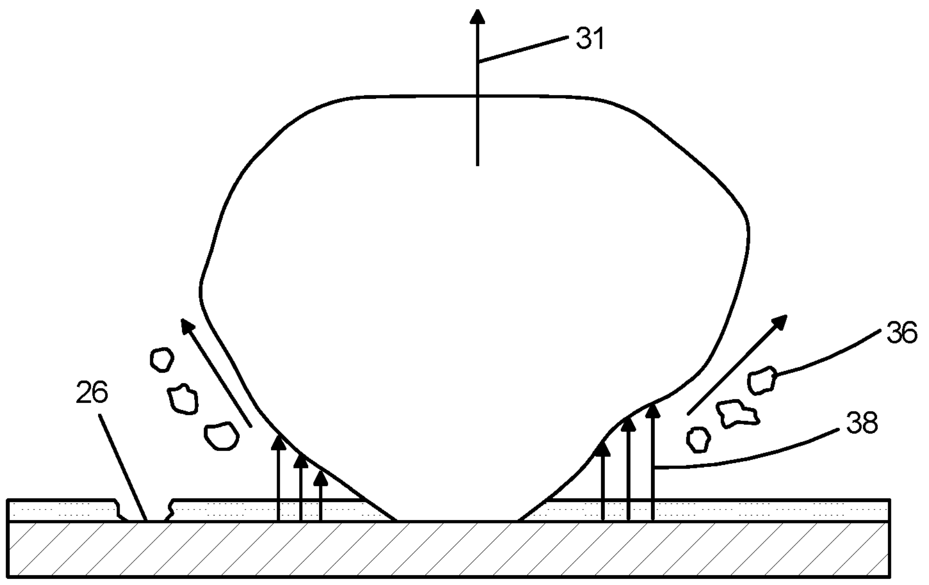
FIG. 4 depicts the breakage of the bond by rapid large expansion of liquid nitrogen (LN) being evaporated into gaseous nitrogen and the dislodgement of microscopic particles and the inner surface of the SRF cavity.

With reference to FIG. 4, rapid evaporation of the liquid nitrogen into gaseous nitrogen 36 produces another unique effect, a local lifting force 38 from beneath the contaminant particulates. As a result of these two unique effects (see FIGS. 3 & 4), this invention possesses superior cleaning power in comparison to conventional technologies such as a high pressure water rinse. It provides removal of a wider size range of particulates down to a few nanometers which is not achievable by existing high pressure water rinsing technology.

Figure 5:
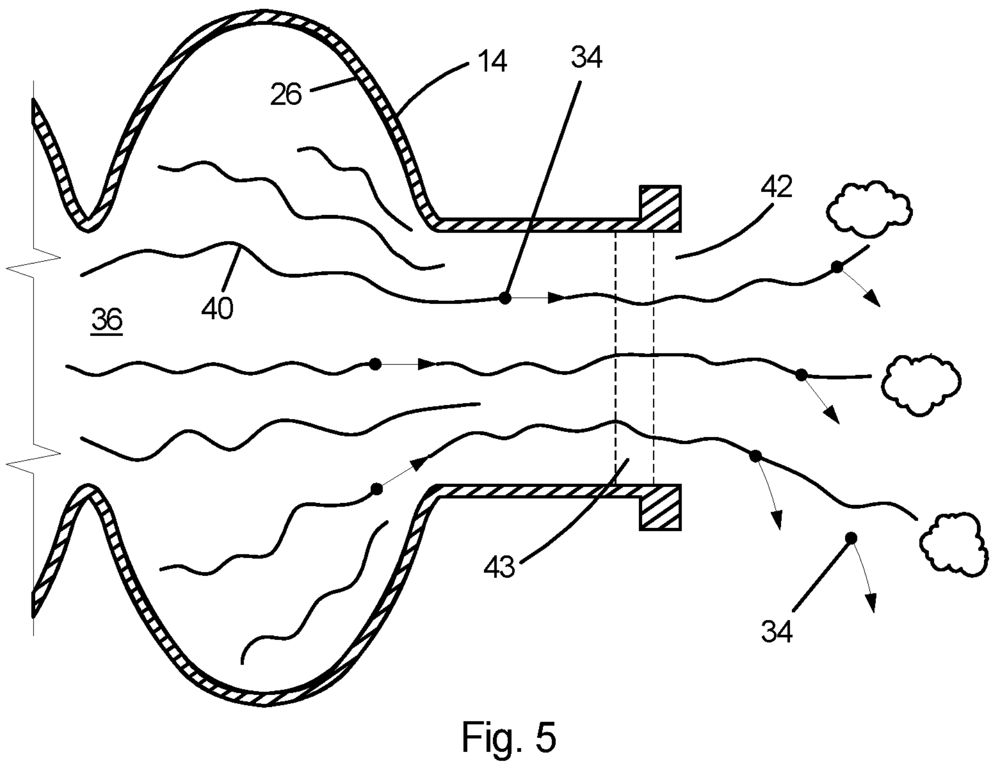
FIG. 5 depicts the transportation of dislodged microscopic particulates to the outer space of the SRF cavity.

The nitrogen gas 36 confined in the cavity space develops into a turbulent gaseous nitrogen flow 40, dragging the removed particulate toward the end of the cavity 14. Particulates entrained in nitrogen gas are then discharged into the ambient air (FIG. 5). Transport of released particulates is governed by the hydrodynamics of the gas flow. Due to the microscopic nature of the particulates of concern and the large nitrogen gas flow rate provided by rapid expansion of the supplied liquid nitrogen, the particulate Stokes number is much less than unity. This insures that particulates will be carried from their release sites all the way to the exhaust port 42, which being the cavity flange port or cavity string termination port. Once past the exhaust port, the particulates settle to the ground or suspend in the ambient air depending on the nature of the particulate. No particulate has a chance of returning to the cleaned space due to positive pressure maintained inside the cavity 14 or cavity string. Particulate capture is possible by inserting a filter 43 into the exhaust line. An external vacuum pump (not shown) can be added in order to boost the throughput. Repeated lance penetration is permitted. The lance is withdrawn after desired cycles of cleaning penetration are accomplished.

Figure 6:
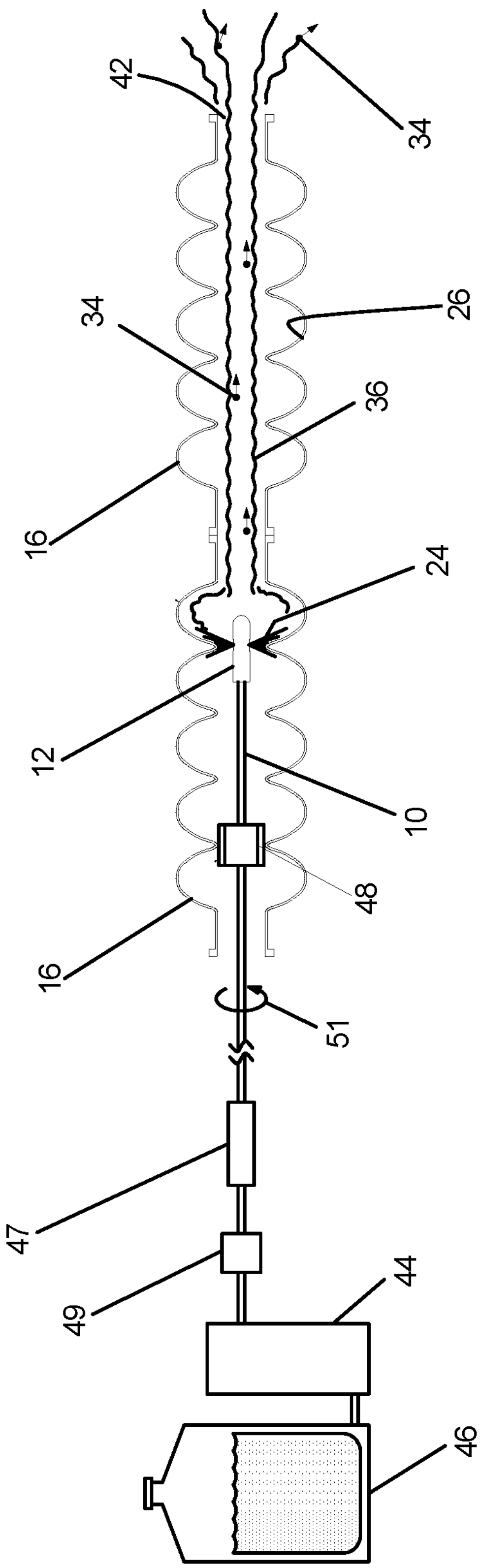
FIG. 6 is a schematic showing the overall layout of a process for removing microscopic contaminant particles from an SFR cavity according to the current invention.

Referring to FIG. 6, the filtered high pressure liquid nitrogen 20 is supplied to the lance 10 by the external cryogenic booster pump 44, which draws liquid nitrogen from an external liquid nitrogen storage tank 46. A filter 47 may be used to remove particulates from the liquid nitrogen supply prior to entering the hollow bore of the lance 10. The high pressure liquid nitrogen 20 is transferred by the lance 10 to its cleaning head 12 and exits through a number of nozzles 22, producing high pressure liquid nitrogen jets 24.

The end result of the process is a cleaned cavity inner surface 26, isolated from the ambient atmosphere. No liquid medium is left behind in the cavity or the cavity string. After cleaning, the remaining nitrogen gas 36 is evacuated by an external vacuum pumping system (not shown). Depending on the length of the cavity or cavity string, the lance may be fitted with a number of centering blocks 48, enabling automatic alignment of the cleaning head 12 with the cavity central axis 50 (see FIG. 1) and furthermore its mechanical confinement. A rotary junction 49 is used to transmit rotational motion 51 to the lance 10 and cleaning head 12. As a result, the sagging or vibration of the lance 10 is prevented and its penetration depth is mechanically unlimited while keeping the cleaning head 12 and the lance 10 from touching the cavity inner surface. As an example, a typical 10 meter long cavity string in modern cryomodules may be cleaned in about an hour or so by manual or automated lance penetration. The outer surface of the centering blocks 48 are preferably overlain with a layer of soft material such as polyvinyl alcohol, isolating direct contact between the lance 10 and the cavity inner surface 26 at its iris locations, hence keeping the cavity irises from being scratched by the rotating lance. The liquid nitrogen jets are regulated by an external control system for varying flow rate or varying pressure, allowing flexibility for concentrated jet blasting against the cavity irises or bypassing some sensitive SRF cavity components such as field probes or the RF input power couplers.

This invention provides a solution that did not exist for final cleaning of a cavity string during production of a new cryomodule. In present day cryomodule production processes, despite each individual cavity being cleaned by high pressure water rinsing, no method is available to remove microscopic particulates generated by the final cavity string assembly process, often resulting in significant loss in usable cavity gradient.

This invention also provides a solution for in-situ recleaning of contaminated cavities in operational cryomodules. Such contamination occurs as a result of particulate input, resulted from either particulate transport by accelerator beams during its regular operation or particulates sweeping from external dirty beamline components during beamline vacuum accidents. Existing in-situ processes, such as helium process or plasma cleaning are ineffective for removal of microscopic particulates, despite limited benefit in removal frozen gases or thin layer of condensed hydrocarbon. Existing in-situ horizontal high pressure water rising has several drawbacks, such as leaving behind water vapor and trapped water in dead space locations. At startup and cooldown of the SRF system, the trapped water will be frozen onto the cavity surface causing operation problems such as strong multipacting in the cavity cells or the RF input power couplers. Additionally, the effect of carbon dioxide dissolving renders deionized water acidic, which may fatally attack sensitive components such as copper plating in the RF input power couplers.

A high pressure liquid nitrogen jet cleaning method and apparatus according to the invention provides several novel particulate removal mechanisms simultaneously, including 1) direct energy transfer generating sound waves, 2) cold shrinkage differential, and 3) rapid evaporation of liquid nitrogen. Other advantages include the unlimited penetration depth of long cavity strings and no liquid medium is left behind in the cavity string after completion of the cleaning process. As a result of these advantages, this invention distinguishes itself from the existing method of SRF cavity cleaning using vertical or horizontal high pressure water.

The current invention also distinguishes itself from prior art in cleaning methods involving liquid nitrogen. As an example, prior art methods of submicron particle removal use liquid nitrogen at ordinary pressure, which entails a different and much less effective cleaning mechanism. As a result, that method has limited power for particulate dislodgment, rendering it incapable of removing strongly bonded particulates such as those fused to the cavity surface due to their exposure to strong radio frequency electromagnetic fields during cryomodule operation. The current invention provides a superior cleaning method that is inaccessible by current high pressure water rinsing technology, allowing extended field emission-free performance of individual cavities for their qualification testing as well as their final cleaning during the production of a new cryomodule.

For applications of recovering contaminated cavities in previously operated cryomodules, the method of the current invention is significantly advantageous as compared to the existing recovery method of horizontal high pressure water rinse. The lance penetration in this invention is mechanically unlimited, hence permitting in-situ cleaning of a long cavity strings in a cryomodule without taking the contaminated cryomodule apart, saving tremendous time and cost.

The apparatus and method of the current invention can be used with any SRF cavity accelerator or with any manufacturing process that requires internal cleaning of microscopic contaminant particulates and transport of removed particulates out of the cleaned space, such as for the production of optical components or for production in the semiconductor industry which requires cleaning of particulates down to a few nanometers in size.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A particle removal apparatus for removing microscopic contaminant particles from the inner surface of one or more SRF accelerator cavities having a central axis, comprising:
- a rotating lance;
- a high pressure liquid nitrogen flow feeding the rotating lance;
- a cleaning head on said lance, said cleaning head including one or more nozzles;
- a hollow bore within said lance and said cleaning head; and
- a mechanism for advancing and retracting the position of the lance within the one or more accelerator cavities.

2. The particle removal apparatus of claim 1, comprising a liquid nitrogen supply to said rotating lance and cleaning head.

3. The particle removal apparatus of claim 2, comprising a filter to remove particulates from said liquid nitrogen supply prior to entering the hollow bore.

4. The particle removal apparatus of claim 1, comprising an exhaust port on said SRF accelerator cavity.

5. The particle removal apparatus of claim 4, comprising a gaseous nitrogen flow to convey microscopic contaminant particles to the exhaust port.

6. The particle removal apparatus of claim 4, comprising a filter on said exhaust port to capture particulate microscopic contaminant particles.

7. The particle removal apparatus of claim 1, comprising a centering block on said lance, said centering block aligning the cleaning head with the central axis of the accelerator cavity and confining the cleaning head from contacting the inner cavity surface.

8. The particle removal apparatus of claim 1, comprising:
- a high pressure liquid nitrogen jet exiting said one or more nozzles; and
- said liquid nitrogen jet at substantially 90° with respect to said central axis of said one or more accelerator cavities.

9. The particle removal apparatus of claim 1, comprising a soft material overlaying said lance centering block to prevent scratching of the inner surface of the cavity or string of cavities.

10. The particle removal apparatus of claim 1, comprising a rotary junction for rotating the lance and cleaning head.

11. The particle removal apparatus of claim 1, comprising a liquid nitrogen supply tank.

12. The particle removal apparatus of claim 11, comprising a booster pump after said liquid nitrogen supply tank to boost the pressure of the liquid nitrogen supplying the lance and cleaning head.

13. The particle removal apparatus of claim 1, comprising the pressure of the liquid nitrogen is 500-6000 psi.

14. The method of claim 13, comprising said nitrogen gas flow providing a particulate Stokes number of less than unity to remove microscopic particulates from the inner surface of the one or more accelerator cavities.

15. A method for removing microscopic contaminant particles from the inner surface of an SRF accelerator cavity or string of cavities having a central axis, said method comprising:
- a rotating lance;
- a liquid nitrogen supply tank;
- a cleaning head on said lance, said cleaning head including one or more nozzles;
- a hollow bore within said lance and said cleaning head;
- a mechanism for advancing and retracting the position of the lance within the accelerator cavity;
- pumping the liquid nitrogen to high pressure;
- conveying the high pressure liquid nitrogen into the hollow bore, the lance, and the cleaning head; and
- streaming a high pressure liquid nitrogen jet out of the one or more nozzles and against the inner surface of the SRF accelerator cavity or string of cavities to dislodge microscopic contaminant particles from said inner surface, said liquid nitrogen converting to gaseous nitrogen after said streaming and collision with said inner surface of the SRF accelerator cavity or string of cavities.

16. The method of claim 15, comprising directing the liquid nitrogen jet at substantially 90° with respect to said central axis of said cavity or string of cavities.

17. The method of claim 15, comprising:
- an exhaust port on said SRF accelerator cavity;
- said gaseous nitrogen and said exhaust port creating a gaseous nitrogen flow from said cleaning head to said exhaust port; and
- conveying the gaseous nitrogen flow to convey the dislodged microscopic contaminant particles to and out of the exhaust port.

18. The method of claim 15, comprising providing a lance centering block on said lance to align the cleaning head with the central axis of the accelerator cavity and confine the cleaning head from contacting the inner cavity surface.

19. The method of claim 18, comprising overlaying said lance centering block to prevent scratching of the inner surface of the cavity or string of cavities.

20. The method of claim 15, comprising said high pressure liquid nitrogen is at 500-6000 psi.

* * * * *